(12) United States Patent
Townsend, III et al.

(10) Patent No.: US 11,734,447 B1
(45) Date of Patent: *Aug. 22, 2023

(54) ELECTRONIC BRIEFCASES FOR INMATE DOCUMENTS

(71) Applicant: CONFINEMENT TELEPHONY TECHNOLOGY, LLC, Greensboro, NC (US)

(72) Inventors: John Vincent Townsend, III, Kernersville, NC (US); Timothy Edwin Pabon, Greensboro, NC (US); Rick Allen Lubbehusen, Winston Salem, NC (US); Eugene B. Joswick, III, Marietta, GA (US)

(73) Assignee: Confinement Telephony Technology, LLC, Greensboro, NC (US)

( * ) Notice: Subject to any disclaimer, the term of this patent is extended or adjusted under 35 U.S.C. 154(b) by 74 days.

This patent is subject to a terminal disclaimer.

(21) Appl. No.: 17/474,587

(22) Filed: Sep. 14, 2021

Related U.S. Application Data

(63) Continuation of application No. 17/150,131, filed on Jan. 15, 2021, now Pat. No. 11,151,279.

(60) Provisional application No. 62/961,759, filed on Jan. 16, 2020.

(51) Int. Cl.
*G06F 21/62* (2013.01)
*G06F 16/93* (2019.01)
*G06F 16/176* (2019.01)

(52) U.S. Cl.
CPC ...... *G06F 21/6227* (2013.01); *G06F 16/1774* (2019.01); *G06F 16/93* (2019.01); *G06F 21/6245* (2013.01); *G06F 2221/2141* (2013.01); *G06F 2221/2145* (2013.01); *G06F 2221/2147* (2013.01)

(58) Field of Classification Search
CPC ............. G06F 21/6227; G06F 21/6245; G06F 16/1774; G06F 16/93; G06F 2221/2147
See application file for complete search history.

(56) References Cited

U.S. PATENT DOCUMENTS

| | | |
|---|---|---|
| 9,378,205 B1 | 6/2016 | Schmidt |
| 9,832,313 B1 * | 11/2017 | Way ..................... H04M 15/10 |
| 9,892,242 B1 | 2/2018 | Hodge |
| 10,169,739 B1 | 1/2019 | Keiser |
| 10,176,334 B2 | 1/2019 | Nicholl |
| 10,277,601 B1 | 4/2019 | Higgins |
| 10,291,617 B2 | 5/2019 | Logan |
| 2005/0021780 A1 | 1/2005 | Beyda |
| 2006/0140405 A1 | 6/2006 | Thommana |
| 2007/0033200 A1 | 2/2007 | Gillespie |

(Continued)

OTHER PUBLICATIONS

U.S. Patent and Trademark Office, Non-Final Office Action, U.S. Appl. No. 17/149,966, 14 pages, dated Mar. 15, 2021.

(Continued)

*Primary Examiner* — Robert B Leung
(74) *Attorney, Agent, or Firm* — Thompson Hine LLP

(57) ABSTRACT

Some implementations disclosed herein provide systems and methods that use an inmate-accessible electronic briefcase to facilitate an inmate's organization of significant content. Electronic documents are created and stored in an organized document storage area that may be accessed while the inmates are incarcerated and after the inmates are released.

8 Claims, 11 Drawing Sheets

(56) References Cited

U.S. PATENT DOCUMENTS

| | | |
|---|---|---|
| 2008/0059500 A1 | 3/2008 | Symens |
| 2008/0059609 A1 | 3/2008 | Ng |
| 2009/0132537 A1 | 5/2009 | Denton |
| 2012/0281058 A1 | 11/2012 | Laney |
| 2013/0179949 A1 | 7/2013 | Shapiro |
| 2014/0258915 A1 | 9/2014 | Lakra |
| 2014/0273929 A1* | 9/2014 | Torgersrud ............ H04M 15/09 455/406 |
| 2014/0279789 A1* | 9/2014 | Torgersrud ............ G06Q 30/02 706/46 |
| 2014/0282896 A1* | 9/2014 | Torgersrud ............. H04L 63/10 726/4 |
| 2016/0191484 A1 | 6/2016 | Gongaware |
| 2016/0316723 A1 | 11/2016 | Wall |
| 2016/0337360 A1 | 11/2016 | Logan |
| 2019/0238912 A1 | 8/2019 | Jockisch |
| 2019/0386996 A1 | 12/2019 | Logan |
| 2020/0201827 A1 | 6/2020 | Chacko |

OTHER PUBLICATIONS

U.S. Patent and Trademark Office, Notice of Allowance, U.S. Appl. No. 17/149,966, 11 pages, dated Jul. 8, 2021.
U.S. Patent and Trademark Office, Corrected Notice of Allowability, U.S. Appl. No. 17/149,966, 2 pages, dated Jul. 16, 2021.
U.S. Patent and Trademark Office, U.S. Appl. No. 17/150,131, Non-Final Office Action, 18 pages, dated Mar. 12, 2021.
U.S. Patent and Trademark Office, Notice of Allowance, U.S. Appl. No. 17/150,131, 13 pages, dated Jun. 29, 2021.
U.S. Patent and Trademark Office, Corrected Notice of Allowability, U.S. Appl. No. 17/150,131, 2 pages, dated Sep. 1, 2021.
U.S. Patent and Trademark Office, U.S. Appl. No. 17/150,145, Non-Final Office Action, 13 pages, dated Mar. 18, 2021.
U.S. Patent and Trademark Office, Non-Final Office Action, U.S. Appl. No. 17/150,145, 19 pages, dated Jun. 18, 2021.
U.S. Patent and Trademark Office, Notice of Allowance and Fee(s) Due, U.S. Appl. No. 17/150,145, 11 pages, dated Dec. 15, 2021.

* cited by examiner

ELECTRONIC BRIEFCASES FOR INMATE DOCUMENTS

RELATED APPLICATIONS

This patent application is a continuation of U.S. patent application Ser. No. 17/150,131 filed on Jan. 15, 2021, which claims the benefit of U.S. Provisional Application No. 62/961,759 filed on Jan. 16, 2020, each of which is incorporated herein by this reference in its entirety.

FIELD OF THE INVENTION

This disclosure relates generally to devices and systems that facilitate the receipt, creation, organization, and use of documents by inmates of confinement institutions.

BACKGROUND

Inmates of prison, jails, and other confinement institutions receive and/or create documents that are important for the inmates to retain for use both within the confinement institutions and following release. As examples, an inmate may receive course completion certificates for education courses taken while incarcerated, disciplinary documents, court documents, facility documents, account documents, and numerous other types of documents. In addition, the postal mail received by an inmate may include financial records, love letters, personalized artwork from the inmate's children, and many other documents that inmates would like to keep during and after their time in the confinement institutions. Unfortunately, documents received and/or created by an inmate can be lost, damaged, or destroyed during the inmates' time within the confinement institutions.

SUMMARY

Some implementations of the invention disclosed herein provide systems and methods that use an inmate-accessible electronic briefcase to facilitate an inmate's organization of significant content. Electronic documents are created and stored in an organized document storage area that may be accessed while the inmates are incarcerated and after the inmates are released. Documents from one or more of multiple sources may be organized into folders within an electronic briefcase. In some implementations, the multiple source include documents created by the inmate (e.g., notes, word processing docs, spreadsheets, and other creative content), documents received from other people (e.g., postal mail scans, counselor documents, attorney documents, loved-one documents, etc.), and/or documents generated by other applications and systems (e.g., educational course documents, disciplinary documents, commissary account documents, jail management system documents, video visitation recordings, audio call recordings, debit account documents, banking account documents, employer documents, facility documents, etc.). Limitations may be applied to the electronic briefcase to prohibit modification and/or deletion of some or all of the documents.

Some implementations facilitate storing postal mail scans within an electronic briefcase. For example, such scans may correspond to postal mail addressed to the inmate, e.g., a letter to the inmate from the inmate's dying mother, an electric utility bill, and a crayon cartoon drawn by the inmate's daughter. Such postal mail may be individually scanned and stored as separate documents, e.g., bitmap, vector graphics documents, documents upon which optical character recognition (OCR) has been run, documents upon which a language translation process has been performed, etc.

Electronic briefcases may be used by non-inmates and inmates after release from a confinement institution. The system may provide briefcases to organize inmate content for law enforcement officers and other non-inmates to access. In one example, the system enables an administrator, an investigator, a counselor, a lawyer, a future employer, or other non-inmate user to set up briefcases for themselves with files for one or more inmates. For example, electronic briefcases may be used to facilitate review of inmate documents for the presence of prohibited content. Documents may be flagged for law enforcement review based on manual or automatic testing and evaluation. Reviewers may utilize reviewer electronic briefcases that organize content from multiple inmate briefcases for convenient access and review. Information about documents, e.g., source, type, content, etc. may be organized, analyzed, provided with statistics, and otherwise presented with user interface features that facilitate reviewer context and determinations. In some implementations, such information is combined or consolidated per inmate and includes information about an inmate's postal mail items, created documents, messages, phone calls, and/or other documents, enabling a reviewer (e.g., an administrator or investigator) to obtain a more complete understanding of an inmate's activities than would otherwise be possible.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE FIGURES

These and other features, implementations, and advantages of the present disclosure are better understood when the following Detailed Description is read with reference to the accompanying drawings.

DETAILED DESCRIPTION

Figure 1:
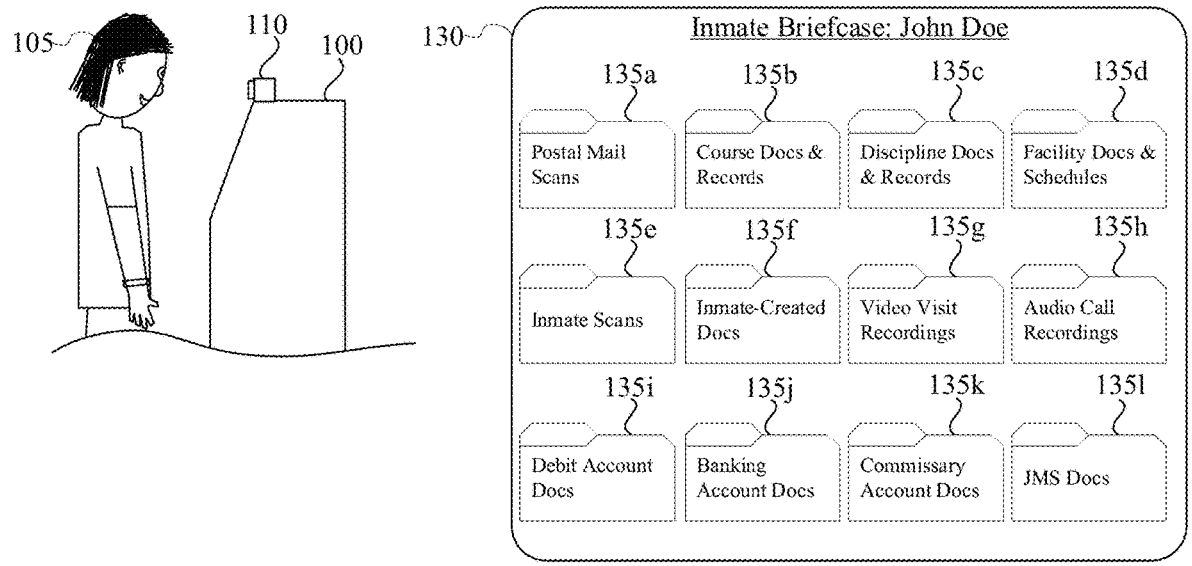
FIG. 1 illustrates an exemplary device providing a user interface of an electronic briefcase of an inmate within a confinement institution according to some implementations disclosed herein.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Some implementations of the invention disclosed herein provide systems and methods that use an inmate-accessible electronic briefcase to facilitate an inmate's organization of significant content. Electronic documents are created and stored in an organized document storage area that may be accessed while the inmates are incarcerated and after the inmates are released. In some implementations, the inmate is enabled to associate individual documents in his or her briefcase with tags, colors, names, or other identifiers to facilitate the inmate's organization of his or her briefcase content. In some implementations, the inmate is enabled to create and use custom electronic document folders within his or her electronic briefcase. For example, the inmate may create a bills folder, a mom folder, a kids folder, a job folder, a parole folder, a coursework folder, a reentry information folder, etc., and associate documents with different folders as an alternative or additional means of organization.

In some implementations, an electronic briefcase includes documents generated based on the inmate's education or vocational activities while within the confinement institution. For example, an inmate may participate in education courses via a tablet, pass evaluations, and receive certificates of attendance, test scores, and other records that are stored as documents in the inmate's electronic briefcase. In some implementations, an electronic education system provides courses, generates certificates, transcripts and other documents, and automatically saves those documents into the participating inmate's briefcase. This automatic saving helps ensure that such documents are not inadvertently lost, buried in electronic messages in an e-mail system, or otherwise not accessible after an inmate's release.

In some implementations, content added to an inmate's electronic briefcase is provided by another person. For example, educational reports and other information about an inmate may be funneled into the inmate's briefcase by a case worker or chaplain. Such individuals may monitor the reports to reduce the potential burden on facility staff to monitor such content.

In some implementations, an electronic briefcase is implemented via a cloud storage or Internet server that makes access to the contents of the electronic briefcase available based on user authentication. In such implementations, a user may access the electronic briefcase from within or outside of the confinement institution and using any device on the corresponding network, e.g., on any Internet accessing device. In some implementations, the same login credentials, e.g., password, biometrics, etc., are used by an inmate accessing a briefcase within the institution and outside of the institution.

In some implementations, access to inmate briefcase and other content is provided via a portal, e.g., an educational portal. In one example, a portal is configured to enable the interaction of incarcerated parents, appointed advocates, or other persons, and to allow children and other users to post images (e.g., pdfs) of schoolwork directly into an inmate's briefcase. Such a portal may provide additional functions, e.g., messaging, contact sharing, etc. In some implementations, system abuse is avoided or reduced by limiting access. For example, only certain users (e.g., teachers, church advocate, etc.) may be enabled to post to the inmate's briefcase while the inmate's child/family member/friend are prohibited from directly posting to the briefcase or using the additional portal services.

In some implementations, an inmate's briefcase includes content items that the inmate creates. For example, the inmate may create notes, calendar entries, lists, memos, essays, letters, applications, spreadsheets, presentations, graphics, drawings, pictures, modified pictures, and other content that may be saved as files and organized in the inmate's briefcase. In some implementations, a tablet or other device accessible by an inmate includes a drawing application that the inmate may use to create pictures and other electronic content to be stored in the inmate's briefcase. In one implementation, an inmate uses paper to draw a picture and note for his or her spouse, parent, child, etc.

and captures a scan or camera image of the item to create an electronic document that is stored in the inmate's briefcase. The inmate can then access this content at a later time, for example, to show the content to a loved one during a visit or after release. In another implementation, an inmate creates a card or writes a letter on physical paper. Instead of mailing it, the facility scans it and an electronic document may be generated, e.g., via scanning, and made available to a third person and a copy may be saved in the inmate's briefcase. In one example, an inmate scans or takes a picture of the physical paper to create an electronic document. In one example, electronic documents including electronic documents generated via inmate scanning are reviewed by facility personal before being added to the inmate's briefcase.

Generally, an administrator, investigator, or other reviewer may additionally or alternatively be enabled to access the inmate's briefcase to review electronic documents that are within or being added to the inmate's briefcase. In some implementations, inmate briefcases are automatically and/or manually reviewed, for example, for investigative purposes to identify criminal activity, conspiracies, inappropriate behavior, patterns, etc. In some implementations, automatic analytical processes include software that analyzes text, image, and/or other content in inmate briefcases. In some implementations, facial recognition is applied to identify individuals depicted in images in inmate briefcases. In some implementations, facial recognition is initiated to search for images of a fugitive, person of interest, or another particular individual. In some implementations, the system is configured to search multiple briefcases, e.g., all briefcases associated with a particular institution or geographic area, to identify sharing of images or other content as a means of inappropriate or prohibited communication, e.g., using images that include symbols or other writing designed to fool text recognition software. In some implementations, a machine learning process such as a neural network is configured and used to detect content in briefcases that includes prohibited or inappropriate material.

In some implementations, an inmate's electronic briefcase includes content items that are for internal-institution-use-only. For example, there may be prison rules, procedures, commissary lists, and institution services that are only applicable within the institution. In some implementations, a method provides content from the inmate's electronic briefcase based on whether the inmate is within the institution or not. In some implementations, some content is stored within a facility-only folder. Such a method may determine whether the inmate is within the institution or not based on a confinement schedule (e.g., entry date, release date, etc.) or based on device location information and the location of the confinement facility.

In some implementations, an electronic briefcase is initially organized as a hierarchical arrangement of folders and documents including default folders and institution-generated documents that are useful to inmates generally. The system may enable each inmate to customize his or her electronic briefcase by creating and editing folders and changing the hierarchical arrangement of folders and documents. The system may enforce naming and content restrictions, e.g., preventing an inmate from naming a folder "guards I'd like to kill," etc.

In some implementations, an electronic briefcase is automatically or manually monitored for inappropriate use and content. For example, all documents may be scanned for illicit words and pictures. In some implementations, suspicious content is automatically flagged for manual review using image or text analysis that identifies vulgar, pornographic, threatening, dangerous, or otherwise undesirable items. In some implementations, suspicious content, e.g., relating to drugs or criminal activities is identified, based on an analysis of the documents. In some implementations, law enforcement is notified based on manual or automatic analysis of the documents. In some implementations, documents are redacted to remove or hide content based on an automatic or manual review process.

In some implementations, the contents of a document may be reviewed using computerized machine learning models trained to calculate a probability that text and images belong in certain categories determined to be in violation of enforced policies. In some implementations, a control group of images and text that are known to belong to a specific category are used to train/adjust the machine learning model/calculations until a sufficiently high probability of accurate categorization is achieved. The model/calculations may be further trained/adjusted against additional groups of images and text to reduce false positives and retain a sufficiently high probability score. In some implementations, a model is trained and used to provide a probability score that a document (e.g., a given image or text content) belongs to a specific or combination of categories.

Various techniques may be used to protect the privacy of the individuals to whom the content is made available. In some implementations, a content item may be encrypted and only decrypted based on provision of the authorized credentials. Such credential-based access may prevent viewing of private content items in the case of an unauthorized access to the file system. In some implementations, file storage for incarcerated residents, staff, and released residents may reside on different physical or virtual networks, to provide additional separation and protection against unauthorized document access. In some implementations, each such network or storage location may have its own distinct database of users and credentials.

In some implementations, an electronic briefcase facilitates the storage, organization, and post-release access of photos and video content.

In some implementations, documents associated with an inmate's accounts (e.g., communications account, commissary account, etc.) are automatically stored or archived in the inmate's electronic briefcase. Such documents may include instructions for accessing account balances post release and may include a link or other electronically-initiated mechanism for receiving balances from accounts that have balances. In some implementations, documents are automatically generated by a jail management system (JMS) and stored in the inmate's electronic briefcase.

Implementations disclosed herein provide numerous benefits through the use of an electronic briefcase. For example, an electronic briefcase provides a centralized and single location in which significant inmate documents can be stored, organized, and accessed after release. Reentry following release from a facility is a difficult experience. Implementations disclosed herein make the reentry process more bearable by providing some continuity with respect to documents that the inmate is using during and after incarceration.

Postal mail packages and/or the individual documents within them may be addressed to an inmate by name or by an inmate identifier such as a numerical code, bar code, symbol, and the like. In some implementations, each inmate may be assigned one or more codes. In one implementation, an inmate is assigned a set of codes that correspond to folders in the inmate's electronic briefcase. A child may use inmate code 12345-01 to direct a hand-drawn piece of artwork to the inmate's memories folder, the inmate's wife may direct a utility bill to the inmate's bills folder, and an attorney may direct a letter to the inmate to a privileged-protected attorney folder.

In some implementations, postal mail packages and/or the individual document within them may include codes that identify the inmate, the sender, the content's category, a financial account that will pay for the document storage, or other information useful in the receiving, scanning, organizing, or retention of the postal mail packages, the individual document within them, and/or electronic documents created therefrom. An account used to pay for document storage may be used for document storage, briefcase access, and/or other functions during an inmate's incarceration and after release.

All information stored by the inmate may be searchable by investigators. The system may enable the investigator to filter by date, content (pictures/text/words). Investigators may be able to add notes to drawings, circle, highlight areas of interest. All flagged areas may be marked, e.g., with the investigator's name etc.

If particular inmate is constantly getting refused mail, but some of the mail is appropriate for the inmate. Then all mail appropriate may be in the electronic briefcase for inmate to see. The electronic briefcase may also identify the other items that are not viewable by the inmate. Such items may be associated with the inmate's briefcase. An investigator may, however, need to review and approve such an item before the item is accessible by the inmate. An investigator may be further enabled to perform investigations using additional briefcase features. For example, a search feature may be enabled to enable search for similar items in other inmates' briefcases (e.g., searching for other items that involve certain foreign countries, types of criminal activity, etc.).

FIG. 1 illustrates an exemplary device 100 providing a user interface 130 of an electronic briefcase of an inmate within a confinement institution. In this example, user 105 uses device 100 to access a user interface 130 of his or her electronic briefcase. In this example, the device 100 is a fixed and/or relatively large (i.e., not hand-held) device such as a kiosk computing device that may be mounted to a wall, floor, or other structure in a confinement facility. The device 100 includes sensors and/or input devices (e.g., camera 110, a touch screen, a keyboard, a mouse etc.) to receive information. The device 100 present a user interface 130 to user 105. The displayed aspect of the user interface 130 includes a set of folders 135*a*-1, in this example, a postal mail scans folder 135*a*, a course docs and records folder 135*b*, a disciple docs and records folder 135*c*, a facility docs and schedules folders 135*d*, an inmate scans folder 135*e*, an inmate-created docs folder 135*f*, a video visits recordings folder 135*g*, an audio call recordings folder 135*h*, a debit account docs folder 135*i*, a banking account docs folder 135*j*, a commissary account docs folder 135*k*, and a jail management system (JMS) docs folder 135*l*.

Figure 2:
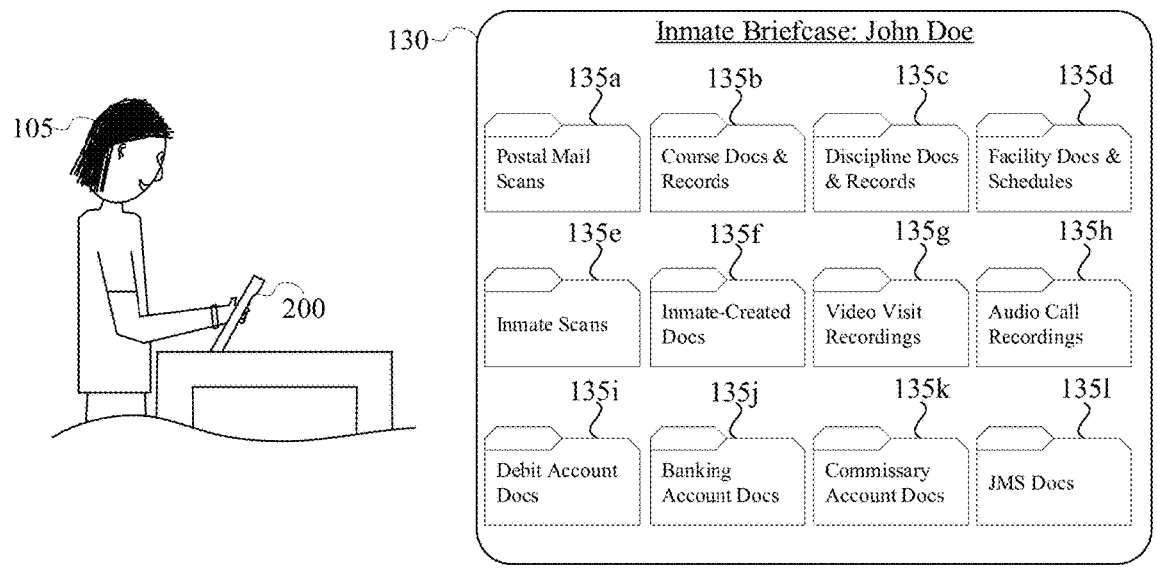
FIG. 2 illustrates another exemplary device providing the user interface of the electronic briefcase of the inmate within a confinement institution according to some implementation disclosed herein.

FIG. 2 illustrates another exemplary device 200 providing the user interface 230 of the electronic briefcase of the inmate with the confinement institution. In this example, user 105 uses device 200 to access the user interface 230 of his or her electronic briefcase. In this example, the device 200 is a portable (i.e., hand-held) device such as a tablet computing device. The device 200 includes sensors and/or input devices to receive information. Similar to device 100 illustrated in FIG. 1, the device 200 of FIG. 2 presents a user interface 230 to user 105. The displayed aspect of the user interface 130 includes the set of folders 135*a*-1.

Figure 3:
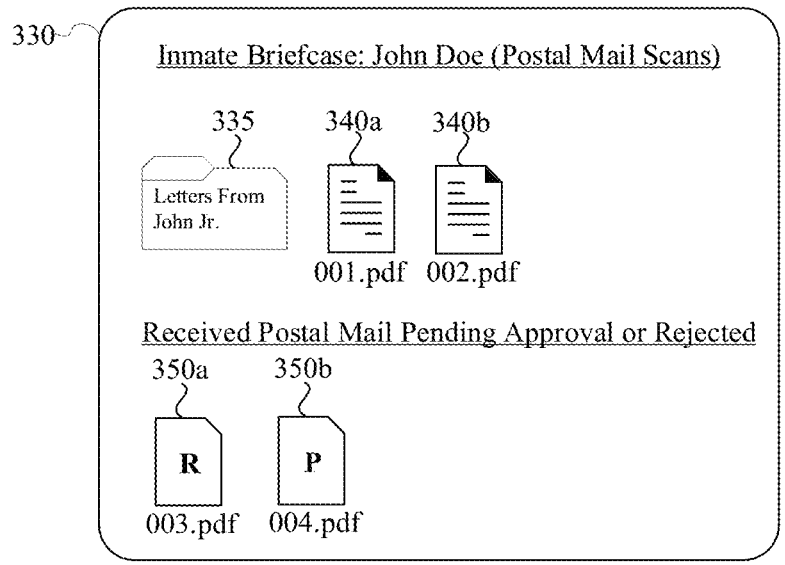
FIG. 3 illustrates additional content of the user interface of FIGS. 1-2 according to some implementations disclosed herein.

FIG. 3 illustrates additional content 330 of the user interface of the electronic briefcase of FIGS. 1-2 provided based on selection of the postal mail scans folder 135*a* (FIG. 1) of the user interface 130. The additional content 330 includes a sub-folder 335 ("Letters From John Jr.") that was created by the inmate and used by the inmate to organize postal mail scans of particular content (i.e., letters from the inmate's son John Jr.). The additional content 330 also includes two individual postal mail scan files: 001.pdf 340*a* and 002.pdf 340*b*. The scanned content of corresponding pieces of postal mail items is accessible by the inmate by selecting these icons.

In some implementations, postal mail items are scanned and stored in electronic storage and associated with the inmate's electronic briefcase. The documents may be encrypted or otherwise inaccessible until cleared, e.g., following review by an administrator, investigator, and/or other reviewer. In the example of FIG. 3, the additional content 330 includes received postal mail that is pending approval or is rejected, including a file 003.pdf 350A that has been received, scanned, and rejected (i.e., as designated by the "R" indictor shown in the user interface). The user interface enables the inmate to see that the document has been received and the indicator shows that the document is not accessible for the reason that it has been rejected, e.g., based on an automatic or manual screen process conducted or overseen by an administrator and/or investigator.

FIG. 3 further illustrates that the additional content includes a file 004.pdf 350*b* that has been received and scanned and that is pending review (i.e., as designated by the "P" indictor shown in the user interface). The user interface enables the inmate to see that the document has been received and the indicator shows that the document is not accessible for the reason that it is still pending review.

Different review, approval, and investigations processes may be implemented. For example, a document (e.g., a scanned postal mail item) may be initially analyzed by an automatic or administrator-performed review and placed in the inmate's briefcase based on such review, e.g., made directly available or made not available (e.g., pending review or rejected). In some workflows, a document (e.g., a scanned postal mail item) is flagged by an automatic or administrator-performed review for further review by an investigator and placed in an inmate's briefcase but made not available (e.g., pending investigator review). In various implementations, the user interface provides indications of the status of a document so that the inmate is informed about the status of his or her documents. This may reduce the burden upon confinement institution staff, administrator, and/or investigators who might otherwise be required to spend time and resources responding to inmate-initiated status requests.

Figure 4:
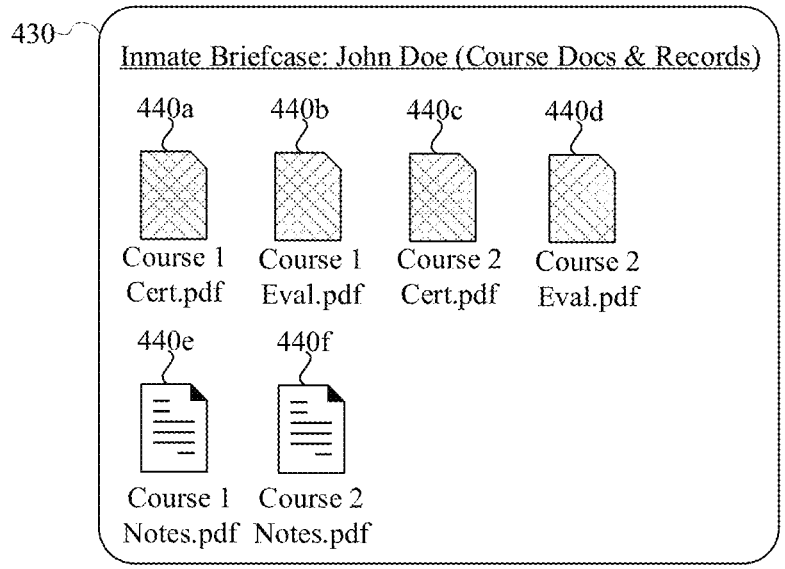
FIG. 4 illustrates additional content of the user interface of FIGS. 1-2 according to some implementations disclosed herein.

FIG. 4 illustrates additional content 430 of the user interface of the electronic briefcase of FIGS. 1-2 provided based on selection of the course docs and records folder 135*b* (FIG. 1) of the user interface 130. In this example, the additional content includes a Course 1 Cert.pdf file 440*a* that has content that certifies that the inmate has completed course 1 (e.g., Course 1 may correspond to the name of the course or other course identifier) and a Course 1 Eval.pdf file 440*b* that provides a record of the test or other evaluation results of the inmate from Course 1, e.g., a percentage of test questions answered correctly, a letter grade, questions and answer content, etc. The additional content 430 similarly includes content from a second course: Course 2 Cert.pdf 440*c* and Course 3 Eval.pdf 440*d*.

The Course 1 and Course 2 documents 440*a-d* may be automatically generated by an education course system. For example, when the inmate completes each course (i.e., completing each of Course 1 and Course 2 by viewing content and completing evaluations via an electronic device), the education course system automatically generates course documents that are automatically stored within the inmate's briefcase. Moreover, the documents 440*a-d* are restricted such that modifications and/or deletion of the documents 440*a-d* within the inmate's electronic briefcase by the inmate is prohibited. The restriction on modification/deletion may be indicated, for example, by providing the representations of the course documents 440*a-d* with restriction indicators (e.g., a diagonal checkered background on the document icons (as illustrated), a specific color, a specific font characteristic, etc.).

The additional content 430 also includes additional course-related documents. In this example, the inmate took notes while participating in the courses and the inmate's notes where automatically saved into the inmate's briefcase as Course 1 Notes.pdf and Course 2 Notes.pdf. In this example, these documents 440*e-f* are not restricted, i.e., the inmate can modify and/or delete the documents 440*e-f*. In other instances, such note documents will have restrictions.

Whether documents are restricted from inmate modification and/or deletion may be dependent upon restriction settings that restrict documents based on the documents source (e.g., education system documents, disciplinary system, commissary system, postal mail documents, facility-provided documents, etc.). Whether documents are restriction from inmate modification and/or deletion may be dependent upon restriction settings that restrict documents based on one or more alternative or additional factors including, but not limited to, document type, document-creator specification (e.g., a flag set by the document creator), document size, the inmate briefcase folder or folder type (e.g., documents in some folders may be modified while documents in other folders may not), and/or based on specification by another user, e.g., an administer or investigator.

Preventing the inmate (and/or others) from modifying and/or deleting certain documents of the inmate's briefcase can provide numerous benefits. It may help ensure that the inmate does not inadvertently lose important documents, for example, documents that the inmate will want or need to find employment and/or documents the inmate will want or need following release from the confinement institution. It may enable others to review or confirm an inmate's record, e.g., enabling a potential future employer to access the inmate's electronic briefcase documents to confirm the inmate's completion of education courses, successful evaluations, and/or disciplinary record. It may enable the confinement institution to make documents available to the inmate with information about the facility, courts, and other resources for the inmate and ensure that such information will remain accessible to the inmate. This may reduce the burden on facility personal and resources that might otherwise be required to respond to inmate requests for information provided by such documents.

Figure 5:
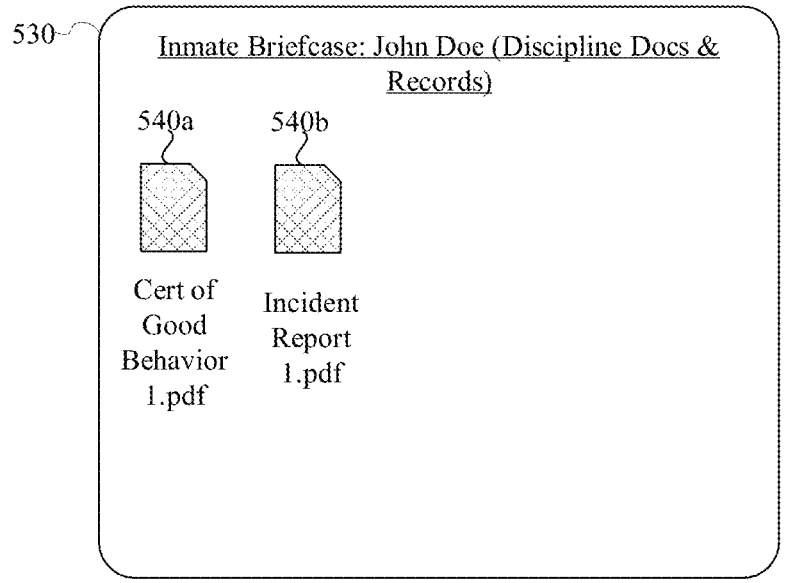
FIG. 5 illustrates additional content of the user interface of FIGS. 1-2 according to some implementations disclosed herein.

FIG. 5 illustrates additional content 530 of the user interface of the electronic briefcase of FIGS. 1-2 provided based on selection of the discipline docs and records folder 135*c* (FIG. 1) of the user interface 130. In this example, the additional content 530 includes a Cert of Good Behavior 1.pdf file 540*a* that certifies that the inmate had good behavior during a period of time, e.g., during the year 2020. The additional content 530 also includes an incident report 1.pdf 540*b* that provides details about a disciplinary incident that occurred involving the inmate. The documents 540*a-b* are restricted such that modifications and/or deletion of the documents 540*a-d* within the inmate's electronic briefcase by the inmate (and/or other users) is prohibited. The restriction on modification/deletion may be indicated, for example, by providing the representations of the course documents 540*a-b* with restriction indicators (e.g., a diagonal checkered background on the document icons (as illustrated), a specific color, a specific font characteristic, etc.).

Figure 6:
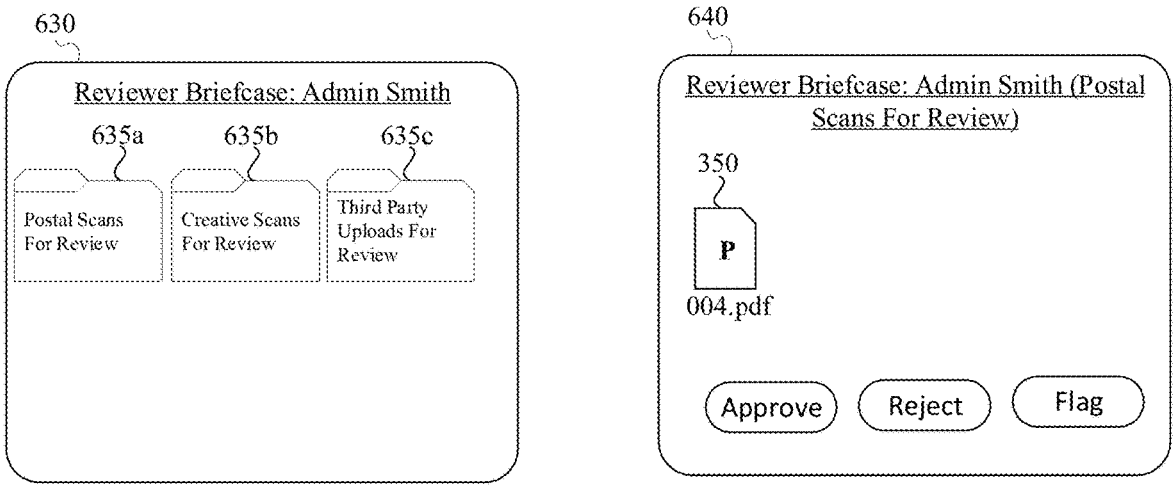
FIG. 6 illustrates an exemplary user interface of an electronic briefcase of an administrator reviewer according to some implementations disclosed herein.

FIG. 6 illustrates an exemplary user interface 630 of an electronic briefcase for administrator review. The reviewer briefcase user interface 630 includes folders that facilitate the reviewer's review of inmate documents, e.g., documents that are (or have been) placed into the electronic briefcase(s) of one or more inmates. In this example, the reviewer briefcase user interface 630 includes a set of folders: a postal scans for review folder 635*a*, a creative scans for review folder 635*b*, and a third party uploads for review folder 635*c*. Selection of these folders enables the administrator reviewer to access and review various sets of documents. For example, selection of postal scans for review folder 635*a* provides additional content 640 that includes the postal scan items (e.g., 004.pdf 350) that the administrator must take action on, e.g., by selecting to approve, reject, or flag each item. In one example, the administrator uses the electronic briefcase user interface 630 to view the content of a document, e.g., 004.pdf 350. This may involve receiving a selection (e.g., by clicking on or touching the corresponding document representation) and a selection of an action at user input button, e.g., an approve button, a reject button, or a flag button.

Figure 7:
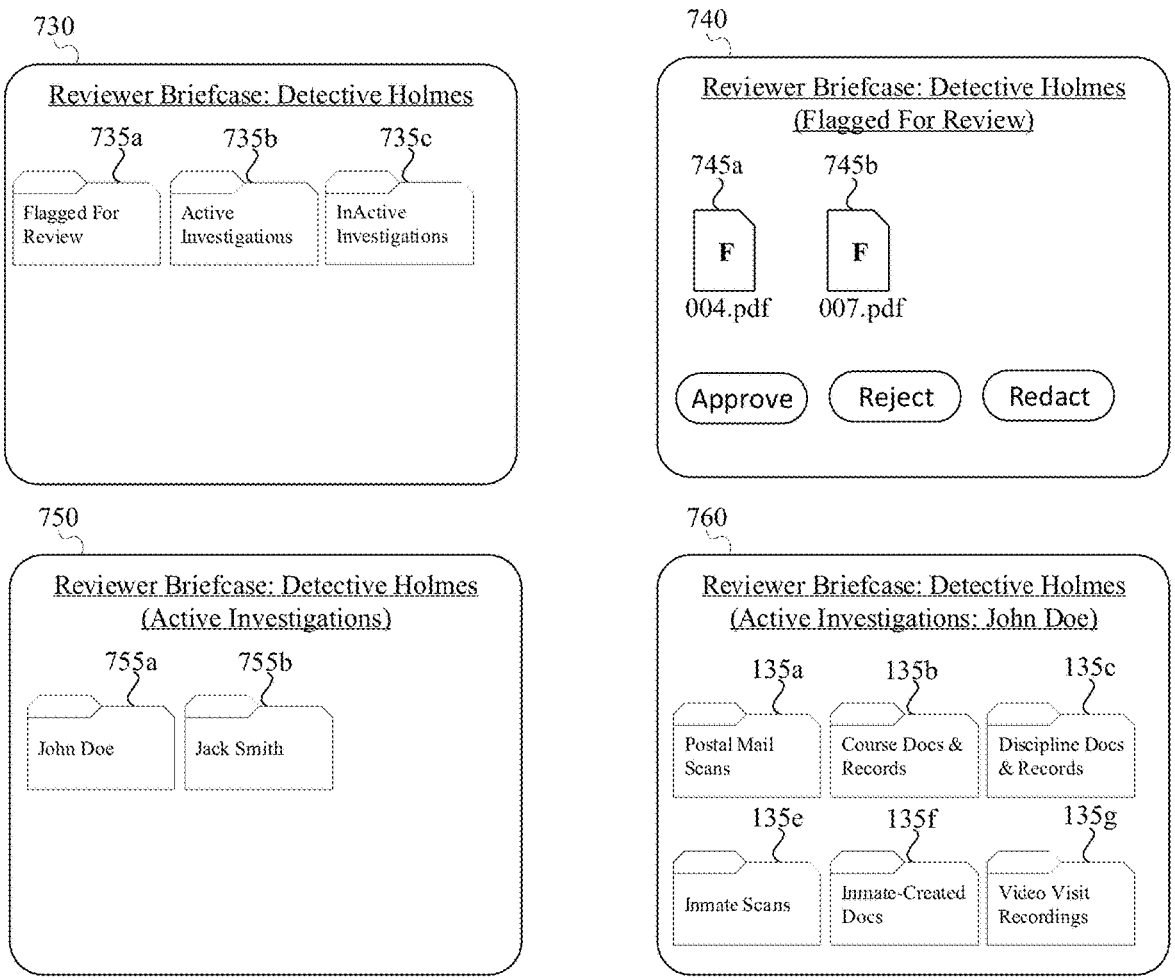
FIG. 7 illustrates an exemplary user interface of an electronic briefcase of an investigator reviewer according to some implementations disclosed herein.

FIG. 7 illustrates an exemplary user interface 730 of an electronic briefcase for investigator review. The investigator briefcase user interface 730 includes folders that facilitate the reviewer's review of inmate documents. In this example, the reviewer briefcase user interface 730 includes a set of folders: a flagged for review folder 735*a*, an active investigations folder 735*b*, and an inactive investigations folder 735*c*. The flagged for review folder 735*a* includes documents flagged, e.g., by an automatic process or manual/administrator-based process. Selection of these folders enables the investigator reviewer to access and review various sets of documents.

For example, selection of the flagged for review folder 735*a* provides additional content 740 that includes 004.pdf (associated with inmate John Doe's electronic briefcase) and 007.pdf (associated with inmate Jack Smith's electronic briefcase). The investigator must take action on these flagged documents, e.g., by selecting to approve or reject, or redact each item. In one example, the investigator uses the electronic briefcase user interface 730 to view the content of a document, e.g., 004.pdf 350. This may involve receiving a selection (e.g., by clicking on or touching the corresponding document representation) and a selection of a user input button, e.g., an approve button, a reject button, or a redact button.

Selection of the Active Investigations folder 735*b* provides additional content 750 that includes inmate-specific investigation folders, e.g., a John Doe folder 755*a* and a Jack Smith folder 755*b*. Such folders may be created by an investigator, e.g., Detective Holmes, initiating an investigation and stored in the investigator's electronic briefcase. Creation of such a folder may give the investigator access to the respective inmate's electronic briefcase documents and/ or provide a place for the investigator to store additional content (e.g., notes, cross references, contact information, etc.) associated with the investigation. In this example, selection of the John Doe folder 755a causes the user interface 730 to provide additional content 760 that includes at least some of the content of that inmate's electronic briefcase, e.g., postal mail scan folder 135a, course docs and records folder 135b, disciple docs and records folder 135c, inmate scans folder 135e, inmate-created documents folder 135f, and/or video visit recordings folder 135g. Which folders of an inmate's electronic briefcase are visible/accessible may vary depending upon the implementation, type of investigation, and/or based on other factors.

Figure 8:
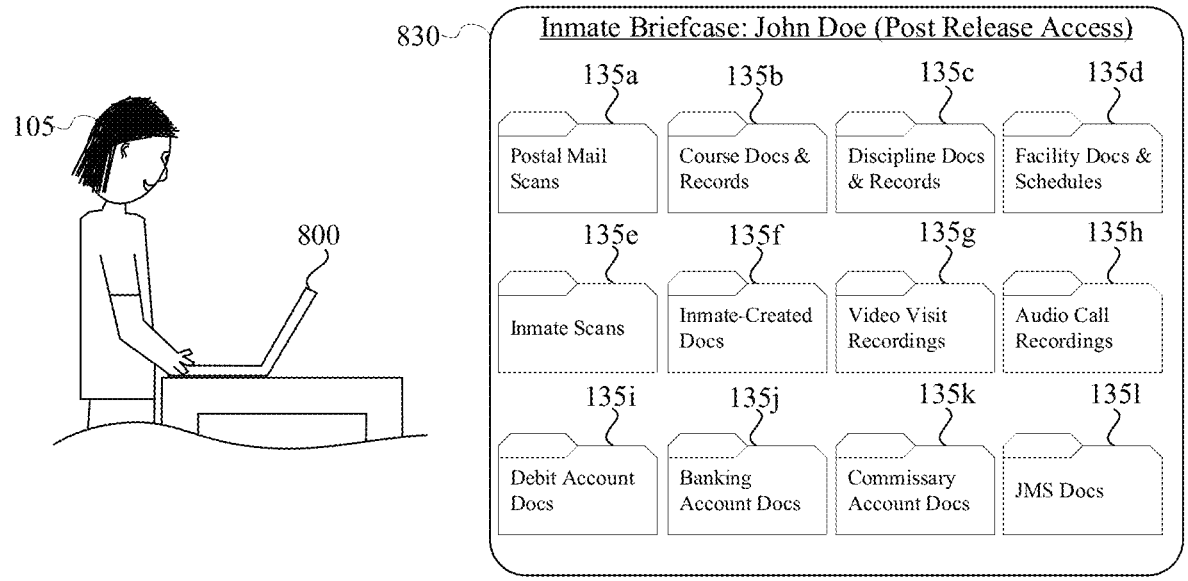
FIG. 8 illustrates an exemplary device providing a user interface of an electronic briefcase of an inmate following release from a confinement institution according to some implementations disclosed herein.

FIG. 8 illustrates an exemplary device 800 providing a user interface 830 of an electronic briefcase of an inmate 105 following release from a confinement institution. For example, the inmate 105 may use device 800 to access the content of his or her electronic briefcase at his or her home following release from the institution. The user interface 830 may or may not have the same organization structure as the user interface 130 accessed by the inmate while within the confinement institution.

Figure 9:
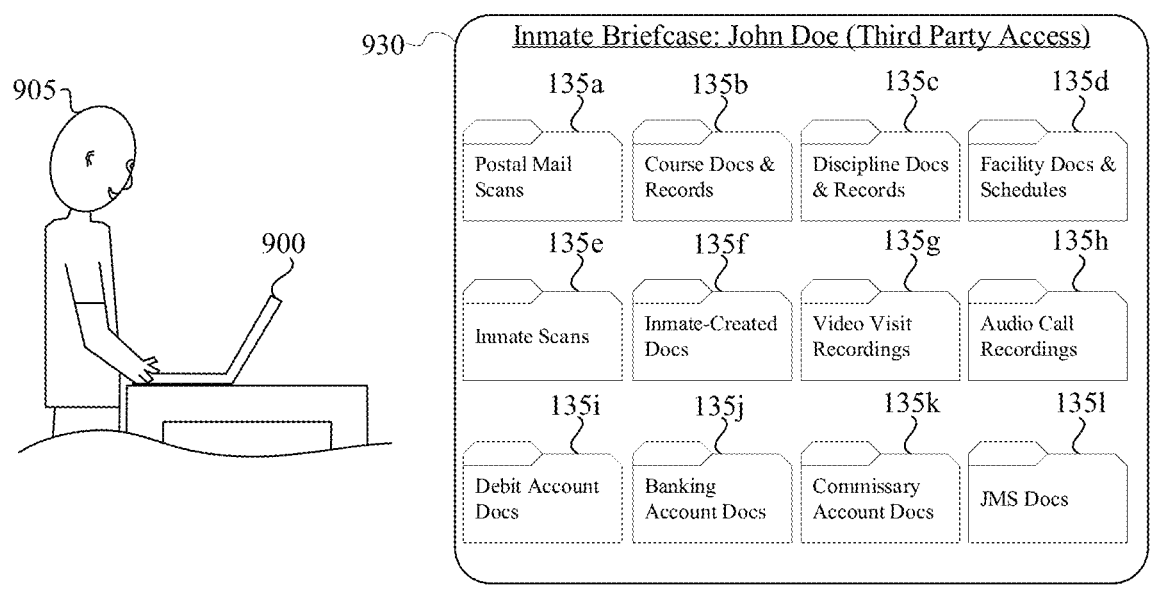
FIG. 9 illustrates an exemplary device providing a user interface of an electronic briefcase of an inmate to a person other than the inmate according to some implementations disclosed herein.

FIG. 9 illustrates an exemplary device 900 providing a user interface 930 of an electronic briefcase of an inmate to a person 905 other than the inmate. For example, the person 905 other than the inmate may be a relative or friend of the inmate that the inmate desires have access to view and/or contribute content to the inmate's electronic briefcase. An inmate's wife, for example, may upload scans of utility bills received for the inmate's house. An inmate's child may upload a scan of a hand-drawn birthday card for the inmate. An inmate's attorney may upload scans of important court documents. An inmate's counselor may upload a scan of reference materials for the inmate.

In some implementations, an inmate subscribes to third-party-provided channels/content services (e.g., want ads, local news, etc.) and gives a service or services providing the channels/content access to add content to the inmate's electronic briefcase, e.g., to specified folders.

Figure 10:
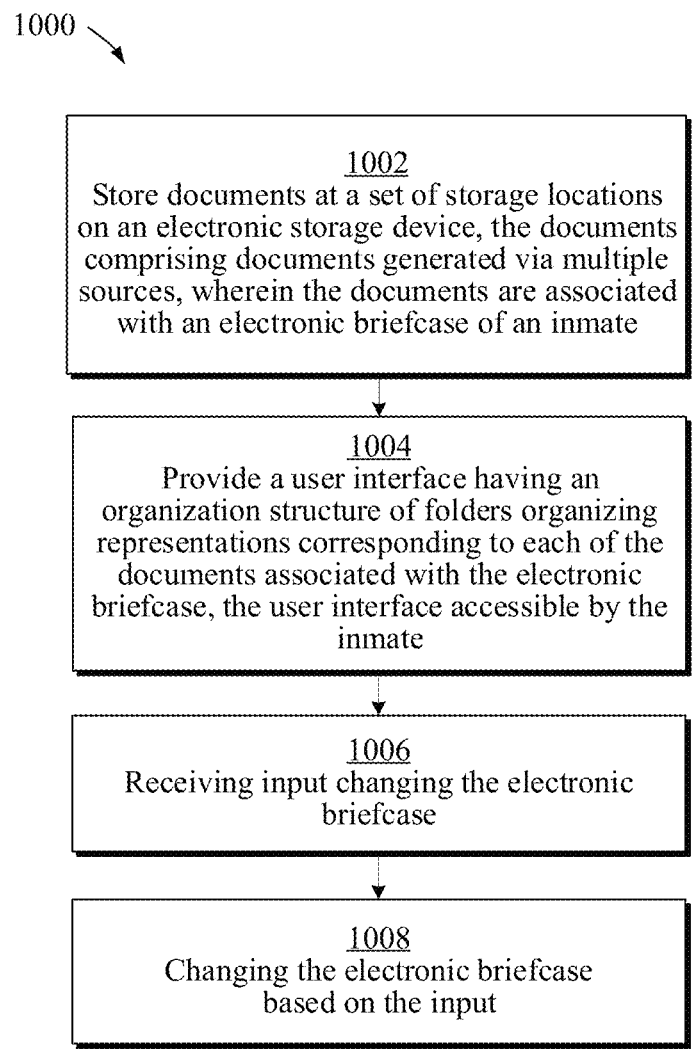
FIG. 10 is a flow chart illustrating an exemplary method for providing an electronic briefcase of inmate documents according to some implementations disclosed herein.

FIG. 10 is a flow chart illustrating an exemplary method 1000 for providing an electronic briefcase of inmate documents. The method can be implemented via a computing device, for example, by storing and using a processor to execute instructions in a non-transitory computer-readable medium. Reference to the method being performed by a computing device includes the method being performed by one or more computing devices and/or using one or more processors.

The method 1000 involves storing documents at a set of storage locations on an electronic storage device, the documents comprising documents generated via multiple sources, where the documents are associated with an electronic briefcase of an inmate, as illustrated in block 1002. The multiple sources may include two or more of a scanning (e.g., postal or non-postal) application, a content creation application, an educational course tracking application, a disciplinary tracking application, a commissary account application, a jail managements system (JMS) application, a video visitation recording application, an audio call recording application, a debit account application, and an inmate banking application.

The method 1000 involves providing a user interface comprising an organization structure (e.g., folders) that comprises folders organizing representations (e.g., icons) corresponding to each of the documents associated with the electronic briefcase, where the user interface is accessible by the inmate, as illustrated in block 1004. The organization structure may comprise one or more folders specific to one or more of the sources, e.g., a folder exclusively for content provided by a respective source of the multiple sources.

The method 1000 involves receiving input changing the electronic briefcase within the user interface, as illustrated in block 1006, and changing the electronic briefcase based on the input, as illustrated in block 1008. For example, the input may create a new document, create a new folder or subfolder, move a document, move a folder, delete a document, delete a folder, grant a permission to another user, associate a category (e.g., tag, color, etc.) with a document, change a category, reorganize the electronic briefcase, export content of the electronic briefcase, or otherwise change an aspect of the electronic briefcase.

In some implementations, the method 1000 further involves providing a second user interface (e.g., a portal accessible by the released inmate or another person) having representations that are selectable to access one or more of the documents of the electronic briefcase of the inmate. In one example, the second user interface is provided to the inmate after release from the confinement institution. In another example, the second user interface is provided to a person other than inmate while the inmate is confined within or after the inmate is released from the confinement institution.

Figure 11:
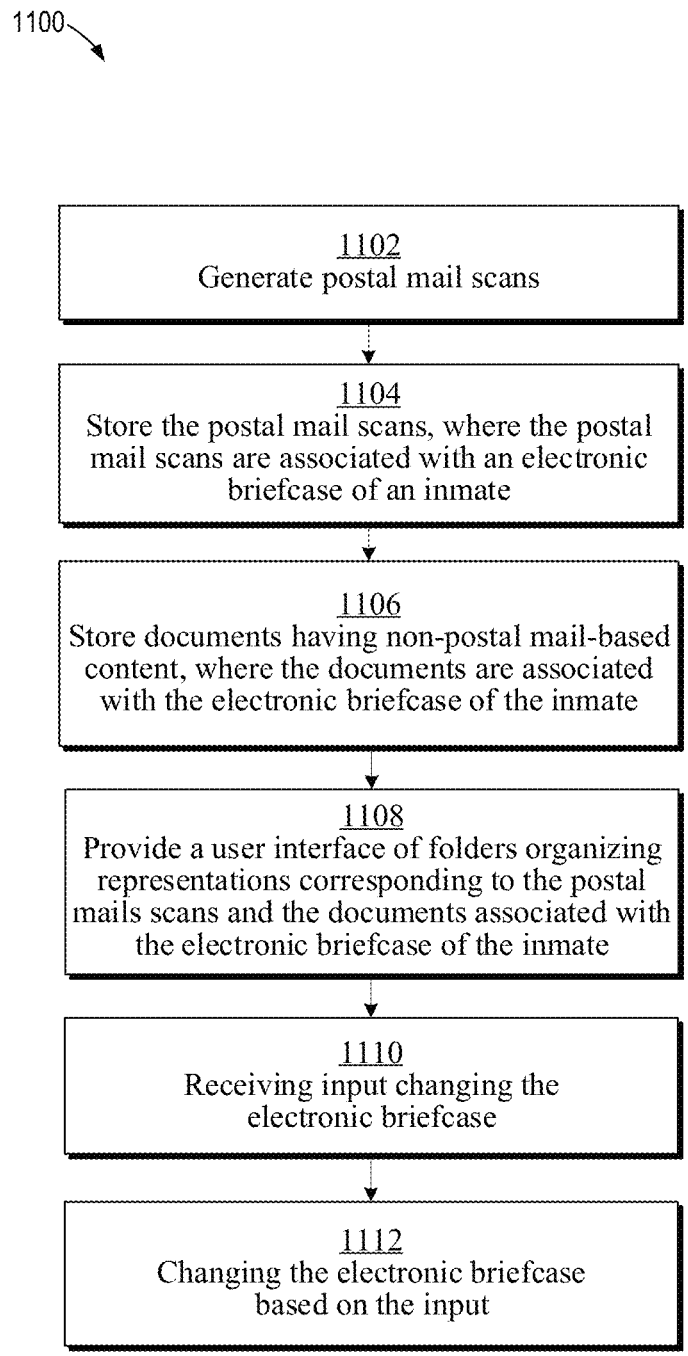
FIG. 11 is a flow chart illustrating an exemplary method for providing an electronic briefcase of inmate documents including postal mail scans according to some implementations disclosed herein.

Some implementations provide an inmate electronic briefcase that provides a single organization structure (e.g., a hierarchy of folders) that enables an inmate to retain and organize postal mail scans and other content in a single place. FIG. 11 is a flow chart illustrating an exemplary method 1100 for providing an electronic briefcase of inmate documents including postal mail scans. The method can be implemented via a computing device, for example, by storing and using a processor to execute instructions in a non-transitory computer-readable medium. Reference to the method being performed by a computing device includes the method being performed by one or more computing devices and/or using one or more processors.

The method 1100 involves generating postal mail scans, as shown in block 1102. For example, this may involve identifying postal mail directed to an inmate, e.g., based on inmate name, ID number, etc. on the postal mail envelope, postcard face, or the content within a postal mail enclosure. The postal mail scans may be one or more images (e.g., files with pixels, vector graphics, text, or other image data) of postal mail items intended for an inmate of a confinement institution. The postal mail may be scanned within the confinement institution or at a separate facility or processing center. Postal mail for multiple inmates may be processed at a single institution, facility, or processing center.

The method 1100 involves storing the postal mail scans, e.g., at a first set of storage locations on an electronic storage device, where the postal mail scans are associated with an electronic briefcase of the inmate, as shown in block 1104. The postal mail scans may be stored on one or more servers and given reference information that associates the postal mail scans with the inmate's electronic briefcase.

The method 1100 further involves storing documents at a second set of storage locations on the electronic storage device, the documents having non-postal mail-based content and associated with the electronic briefcase of the inmate, as shown in block 1106. For example, this may involve storing other scans, app-created documents, education/course records, video visitation recordings, etc.

At block 1108, the method 1100 further involves providing a user interface having an organization structure of folders organizing representations (e.g., icons) corresponding to each of the postal mail scans and the documents associated with the electronic briefcase, where the user interface accessible by the inmate. The user interface may provide a hierarchical arrangement of the folders corresponding to a hierarchy of the organization structure. The user interface may enforce a restriction preventing changing one or more of the postal mail scans or documents. For example, a permanent flag associated with a subset of the scans or documents indicating scans or documents may indicate that items of the subset cannot be changed by the inmate (and/or other persons). Such a restriction may prevent changing, for example, behavioral/disciplinary records, educational records, and/or financial documents, that are manually or automatically associated with the electronic briefcase of the inmate.

At block 1110, the method 1100 involves receiving input changing the electronic briefcase within the user interface and, at block 1112, the method 1100 involves changing the electronic briefcase based on the input. For example, the input may create a new document, create a new folder or sub-folder, move a document, move a folder, delete a document, delete a folder, grant a permission to another user, add a category associated with a postal mail scan or document, change a category, reorganize the electronic briefcase, export content of the electronic briefcase, or otherwise change an aspect of the electronic briefcase.

In some implementations, the user interface provides tools that enable the inmate to add new content to his or her electronic briefcase. Fore example, the user interface may provide a tool that enables an inmate to provide input adding a scanned document corresponding to a non-postal mail item and, based on the input, adding a representation corresponding to the scanned document to the organizational structure. As another example, the method 1100 may receive input from the inmate adding a document generated based on inmate-provided content via a content creation app (e.g., word processing app, drawing app, spreadsheet app, etc.) and, based on the input, adding a representation corresponding to the document to the organizational structure.

In some implementations, a portal (e.g., a user interface accessed from outside the confinement institution) provides a non-inmate access to the electronic briefcase of the inmate. Such a portal may provide access to a limited subset of the electronic briefcase. For example, predetermined permission settings may be set by an administrator and/or the inmate to limit which folders and/or content is available via the portal to persons other than the inmate. The portal may provide access (by the inmate or a person other than the inmate) to the electronic briefcase of the inmate following release of the inmate from the confinement institution.

In some implementations, other users are enabled to change the content of an inmate's electronic briefcase. For example, this may involve receiving input via a portal accessed by a non-inmate (e.g., inmate's spouse, investigator, counselor, public defender, etc.) associating a document with or changing a document within the electronic briefcase of the inmate and, based on the input, updating the electronic briefcase of the inmate.

In some implementations, some of the content of an inmate's electronic briefcase is automatically populated by one or more applications. This may involve receiving an automatically-generated change request associating a document (e.g., an educational course record, a behavioral report, a financial document, etc.) with or changing a document within the electronic briefcase of the inmate and, based on the automatically-generated change request, updating the electronic briefcase of the inmate.

In some implementations, access to a portion of a postal mail scan (some or all) via a representation of the user interface is prohibited based on a determination that the portion comprises prohibited content. For example, a reviewer such as an investigator may select to deny access to some or all of a document based on a review of the document. In another example, a reviewer such as an administrator may flag some or all of a document for review by an investigator. In another example, a document may be permanently banned from access (although an icon or other indication may be presented without providing access). Such a ban may be based on a manual or automatic rejection of the document.

Figure 12:
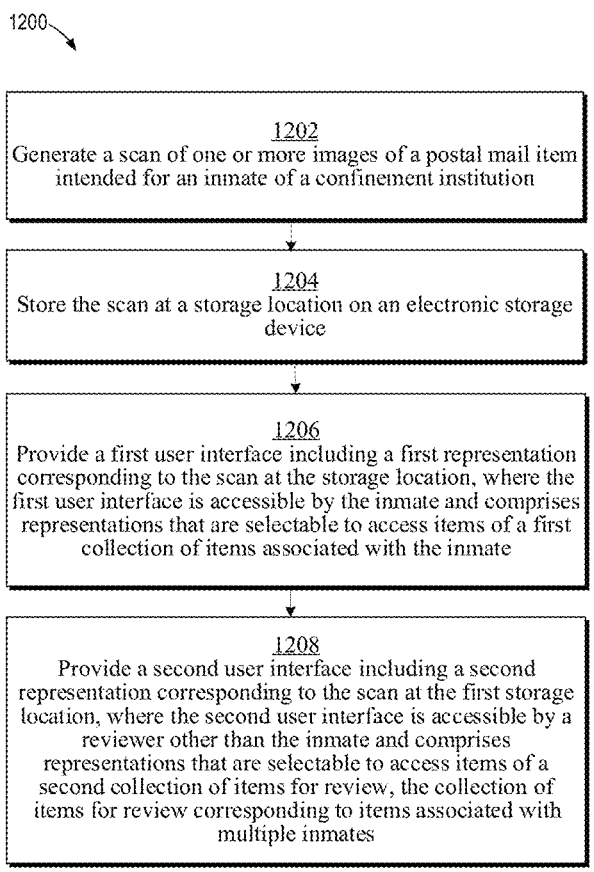
FIG. 12 is a flow chart illustrating an exemplary method for providing electronic briefcases of inmate documents including postal mail scans to an inmate and a reviewer according to some implementations disclosed herein.

Some implementations provide both an inmate briefcase and a reviewer (administrator or investigator) briefcase that each provide access to inmate documents. FIG. 12 is a flow chart illustrating an exemplary method 1200 for providing electronic briefcases of inmate documents including postal mail scans to an inmate and a reviewer. The method can be implemented via a computing device, for example, by storing and using a processor to execute instructions in a non-transitory computer-readable medium. Reference to the method being performed by a computing device includes the method being performed by one or more computing devices and/or using one or more processors.

The method 1200 involves generating a scan comprising one or more images of a postal mail item intended for an inmate of a confinement institution, as shown in block 1202. At block 1204, the method 1200 involves storing the scan at a storage location on an electronic storage device, e.g., at a location on a server. At block 1206, the method 1200 provides a first user interface (e.g., the inmate's briefcase) comprising a first representation (e.g., icon) corresponding to the scan at the storage location, as shown in block 1206. The first user interface is accessible by the inmate and comprises representations (e.g., icons) that are selectable to access items of a first collection of items associated with the inmate (e.g., postal mail scans, stored documents, education certificates, videos, etc.).

At block 1208, the method 1200 provides a second user interface (e.g., an admin briefcase or an investigator's briefcase) comprising a second representation corresponding to the scan at the first storage location. The second user interface is accessible by a reviewer other than the inmate and comprises representations that are selectable to access items of a second collection of items for review. The collection of items for review may correspond to items associated with multiple inmates. The items may include items that the investigator has already investigated and/or items that are flagged for future investigation by the investigator.

In some implementations, the inmate is given selected and/or limited access (e.g., based on encryption of documents) that allows or prevents inmate access to a document based on a reviewer determination. For example, access by the inmate to a portion of the scan (some or all) via the first representation may be prohibited based on a determination received via the second user interface. For example, an investigator may select to deny access to some or all of the scan based on a review, e.g., flagging the scan for further review or rejecting the scan to provide a permanent ban on inmate access to the scan.

In some implementations, documents are associated with an inmate's electronic briefcase but encrypted so that the user interface of the electronic briefcase is able to display a representation of the documents but unable to provide access to the encrypted content of the document. The documents may be decrypted at later points in time to provide access to document contents in appropriate circumstances, e.g., following investigator review.

Some implementations facilitate a multi-phase review process. For example, such a process may involve an initial phase during which an administrator makes preliminary determinations regarding documents (e.g., approve, reject, redact, flag, etc.) and a follow up phase during which an investigator reviews documents (e.g., documents that are flagged for review) and approves, denies, redacts, etc. the documents. For example, method 1200 may receive a conditional approval of a scan from an administrator, where the scan is flagged for investigator review. Based on the conditional approval, the scan may be stored in an encrypted form at the storage location. The first representation on the first user interface may indicate that the postal mail item has been received and scanned without providing access to view the scan, while the encrypted form prevents access to view the content of the scan. The method 1200 may further receive a clearance (e.g., approval) from the investigator via the second user interface, where the clearance indicates that a portion (e.g., some or all) of the scan is cleared for inmate access. Note that the second user interface, e.g., the user interface used by the investigator, may provide access to view the encrypted scan. Based on the clearance, the portion of the scan (e.g., some or all) is decrypted to enable access to view of the portion via the first representation on the first user interface, i.e., the inmate is able to view the content of the scan in his or her electronic briefcase user interface.

In another example, the method 1200 receives an approval of the scan from an administrator, wherein the scan is flagged for investigator review. Based on the approval, the scan is stored in a redacted form at the storage location, where the first representation on the first user interface indicates that the postal mail item has been received and scanned without providing access to view a redacted portion of the scan. A clearance is received from the investigator via the second user interface, the clearance indicating that the redacted portion (some or all) of the scan is cleared for inmate access, where the second user interface provides access to view the redacted portion of the scan. Based on the clearance, the redacted portion of the scan is un-redacted to enable access via the first representation on the first user interface.

Figure 13:
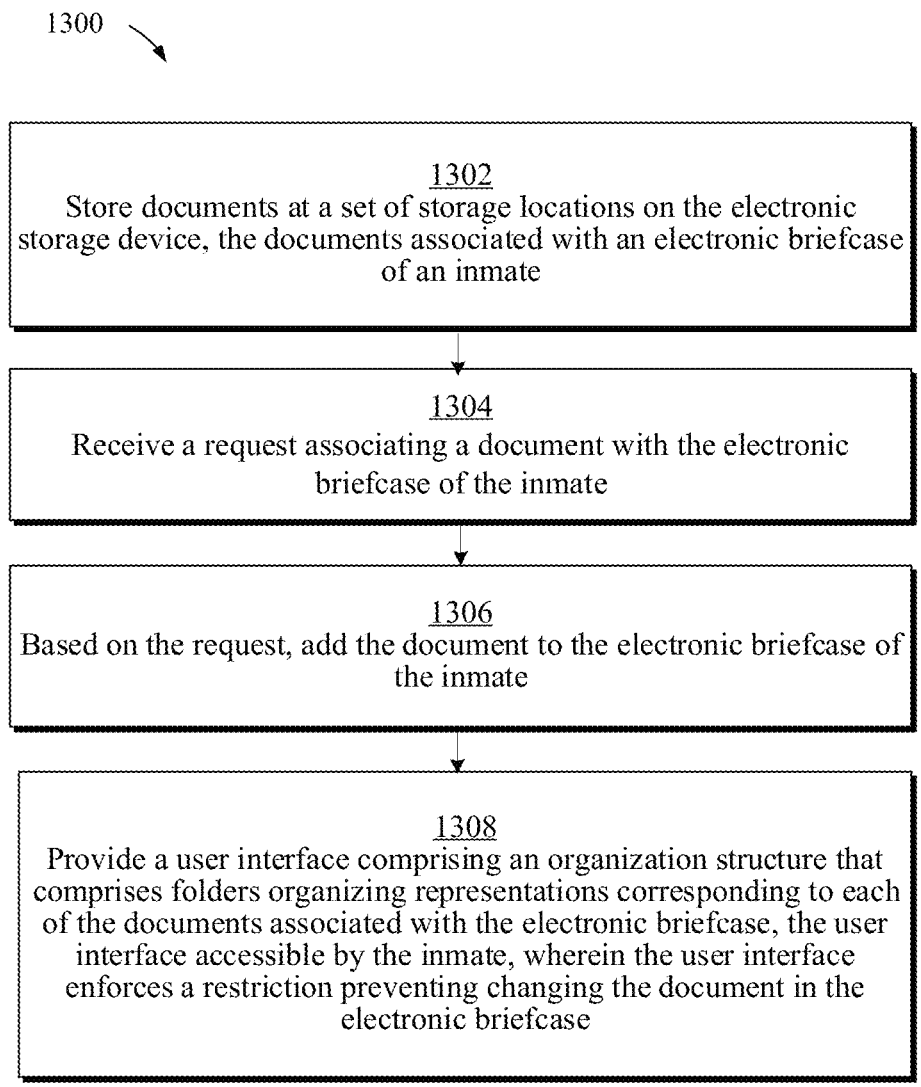
FIG. 13 is a flow chart illustrating an exemplary method for providing an electronic briefcase that enforces a restriction to preserve content within an inmate electronic briefcase according to some implementations disclosed herein.

Some implementations provide an inmate briefcase that provides an organization structure (e.g., a hierarchy of folders) that enables an inmate to retain and organize inmate content items, where at least some of the content items are permanent, i.e., the inmate is restricted from changing those docs. FIG. 13 is a flow chart illustrating an exemplary method 1300 for providing an electronic briefcase that enforces a restriction to preserve content within an inmate electronic briefcase. The method can be implemented via a computing device, for example, by storing and using a processor to execute instructions in a non-transitory computer-readable medium. Reference to the method being performed by a computing device includes the method being performed by one or more computing devices and/or using one or more processors.

The method 1300 stores documents at a set of storage locations on the electronic storage device, the documents associated with an electronic briefcase of an inmate, e.g., storing scans, app-created documents, education certificates, videos, etc. as shown at block 1302. At block 1304, the method 1300 involves receiving a request associating a document with the electronic briefcase of the inmate. The request may be an automated request, e.g., from an application requesting to add an educational course record, a behavioral/disciplinary report, a financial document, etc. The request may be triggered according to a predetermined schedule (e.g., monthly statements) or triggered by a user action (e.g., the inmate requesting a report of current debit account activity). The request may be initiated from a person other than the inmate, e.g., adding a counselor report, court documents, documents provided by a public defender, documents provided by a loved one, a photo, a video, etc. to the inmate's electronic briefcase. The request may be approved by a reviewer (e.g., an administrator) before being accepted.

At block 1306, the method 1300, based on the request, adds the document to the electronic briefcase of the inmate. At block 1308, the method 1300 provides a user interface comprising an organization structure that comprises folders organizing representations (e.g., icons) corresponding to each of the documents associated with the electronic briefcase. The user interface is accessible by the inmate and enforces a restriction preventing changing the document in the electronic briefcase. In one example, the restriction allows reorganization of the document within different folders but prohibits changing document content or deleting the document from the electronic briefcase.

In some implementations, the method 1300 involves requiring a fee to access a document associated with an inmate's electronic briefcase or to add a document (i.e., creating a new document-to-briefcase association) to an inmate's briefcase. This may involve determining a type of the document, based on the type of the document, tracking the request in an account, and associating a fee with the request in the account based on the type of the document. Different fees may be required for photos, videos, text, etc.

Figure 14:
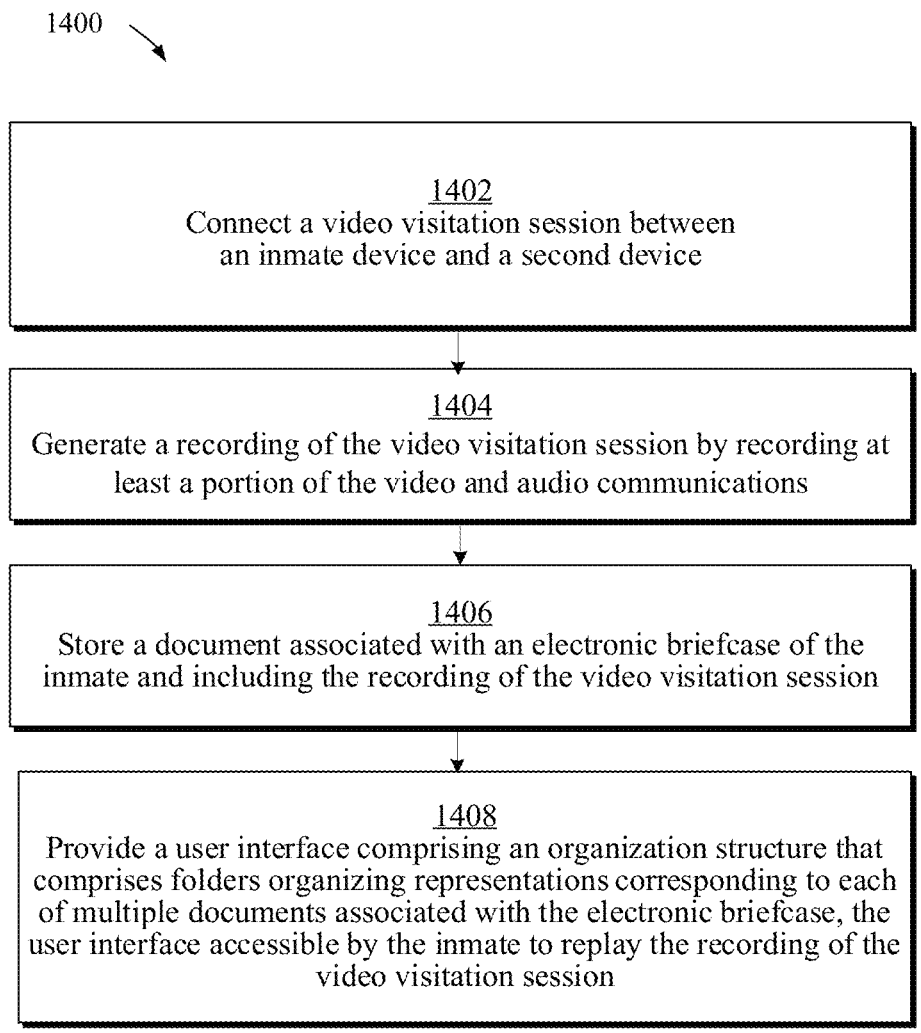
FIG. 14 is a flow chart illustrating an exemplary method for providing an electronic briefcase of inmate documents including video visitation recordings according to some implementations disclosed herein.

Some implementations provide an inmate briefcase that provides an organization structure (e.g., a hierarchy of folders) that enables an inmate to retain and organize inmate content items, where at least some of the content items are video visitation recordings. FIG. 14 is a flow chart illustrating an exemplary method 1400 for providing an electronic briefcase of inmate documents including video visitation recordings. The method can be implemented via a computing device, for example, by storing and using a processor to execute instructions in a non-transitory computer-readable medium. Reference to the method being performed by a computing device includes the method being performed by one or more computing devices and/or using one or more processors.

The method 1400, at block 1402, involves connecting a video visitation session between an inmate device and a second device. This may involve the use of communications apps on each of the devices that send and receive messages via the Internet or other communications network. The video visitation session may include video and audio communications between the inmate device and the second device. At block 1404, the method 1400 involves generating a recording of the video visitation session by recording at least a portion of the video and audio communications. The method 1400 stores a document at a storage location on an electronic storage device, the document associated with an electronic briefcase of the inmate and including the recording of the video visitation session, as shown in block 1406. At block 1408, the method provides a user interface having an organization structure that comprises folders organizing representations (e.g., icons) corresponding to each of multiple documents associated with the electronic briefcase, where the user interface is accessible by the inmate to replay the recording of the video visitation session. In some implementations, the method 1400 provides affordances on the inmate device and/or the second device to authorize (e.g., receive input authorizing) the recording of the video visitation session prior to generating the recording.

In some implementations, the creation of and/or storage or video visitation recordings is based on an inmate-specified preference or purchase (e.g., payment of a fee). In some implementations, video visitation sessions are recorded automatically and stored for reference by investigators and other authorized parties. Privileged video visitation sessions (e.g., involving legal counsel and medical providers) may be controlled to prohibit access by unauthorized persons, i.e., to preserve the privileged-nature of the communications. An inmate may be given access to his or her own video visitation recordings and/or such recordings may be included in the inmate's electronic briefcase based on determining that one or more conditions (e.g., inmate status, good behavior, payment of a fee, account status, briefcase storage limitations, etc.) are satisfied.

Figure 15:
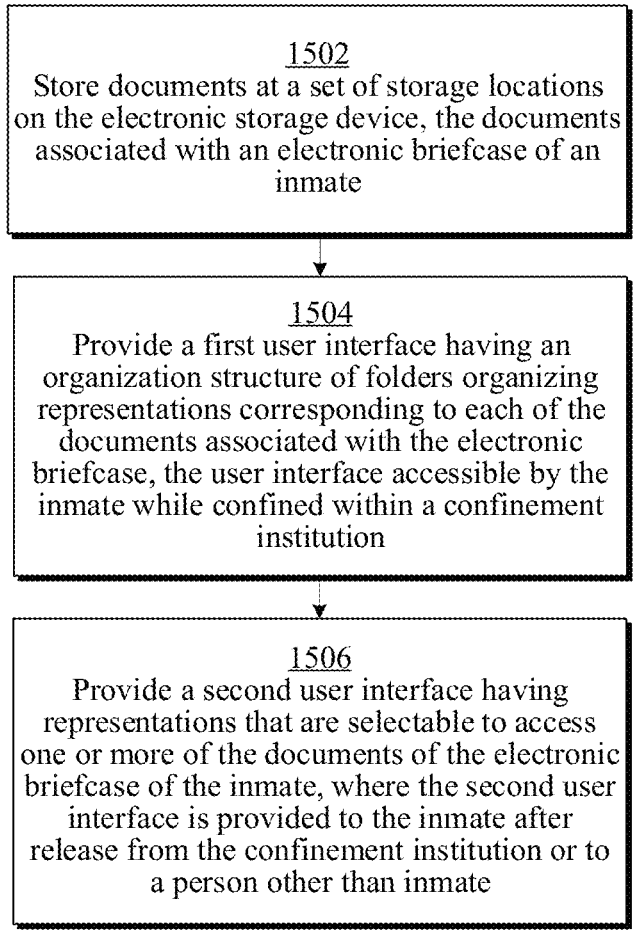
FIG. 15 is a flow chart illustrating an exemplary method for providing electronic briefcase of inmate documents to an inmate after release or to another person other than the inmate according to some implementations disclosed herein.

Some implementations provide an inmate briefcase that provides an organization structure (e.g., a hierarchy of folders) that enables an inmate to retain and organize inmate content items, where at least some of the content items are accessible both by the inmate while confined and after release or accessible to a person other than the inmate. FIG. 15 is a flow chart illustrating an exemplary method 1500 for providing electronic briefcases of inmate documents to an inmate after release or to another person other than the inmate. The method can be implemented via a computing device, for example, by storing and using a processor to execute instructions in a non-transitory computer-readable medium. Reference to the method being performed by a computing device includes the method being performed by one or more computing devices and/or using one or more processors.

The method 1500, at block 1502, involves documents at a set of storage locations on the electronic storage device, the documents associated with an electronic briefcase of an inmate. The documents associated with the electronic briefcase may include scans of physical documents, scans of app-created documents, automatically-generated documents, documents associated with the electronic briefcase by the inmate, documents associated with the electronic briefcase by a person other than the inmate, and documents automatically associated with the electronic briefcase.

At block 1504, the method 1500 involves providing a first user interface comprising an organization structure that comprises folders organizing representations (e.g., icons) corresponding to each of the documents associated with the electronic briefcase, the user interface accessible by the inmate while confined within a confinement institution. The method 1500, at block 1506, providing a second user interface (e.g., a portal accessible by the released inmate or another person) comprising representations that are selectable to access one or more of the documents of the electronic briefcase of the inmate. The second user interface may have the same organization structure as the first user interface.

In some implementations, the second user interface is provided to the inmate after release from the confinement institution. In one example, the inmate may access the second user interface outside of the confinement institution by providing login credentials used to access the first user interface while confined within the confinement institution. The method 1500 may involve determining whether an electronic briefcase maintenance criteria is satisfied and determining to maintain the electronic briefcase or disable the electronic briefcase based on whether the electronic briefcase maintenance criteria is satisfied. For example, the criteria may include whether the inmate has accessed the electronic briefcase within a threshold amount of time and/or whether the inmate has provided payment for extended use of the electronic briefcase.

In some implementations, the second user interface is provided to a person other than inmate while the inmate is confined or after release. The second user interface may provide access to less than all of the documents associated with the electronic briefcase to the person other than the inmate based on a permission setting. The second user interface may provide access to less than all of the documents associated with the electronic briefcase to the person other than the inmate based on the person other than the inmate providing login credentials of an account associated with the permission setting. The person other than the inmate may be a public defender, a lawyer, a case worker, or a potential employer of the inmate.

Exemplary System

Figure 16:
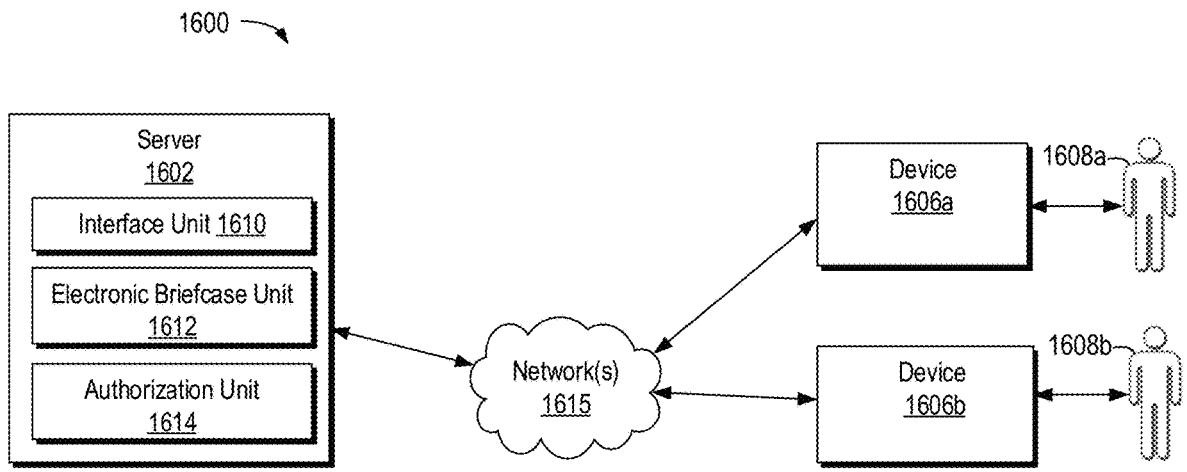
FIG. 16 is a block diagram of a computing environment in which one or more implementations of the invention can be practiced.

FIG. 16 is a diagram of an environment in which one or more implementations of the present disclosure can be practiced. The system configuration of FIG. 16 is provided as one example of a system configuration. In a particular implementation, devices and the communications between them as well as the allocation of functionality amongst the multiple devices involved can be configured differently depending upon the particular circumstances of the implementation.

In FIG. 16, there is a server 1602 and user devices 1606a and 1606b used by persons 1608a and 1608b, who may be inmates or non-inmates. These devices 1602 and 1606a-b may be configured to communicate with one another via network 1615. For example, the user devices 1606a-b can be configured with apps (e.g., a web browser or a specialized app) for communicating with one another and with server 1602. The apps can additionally or alternatively include calling/messaging functionality enabling the inmates to place calls, receive calls, send messages, receive messages, and for other purposes related to communications with and information about the inmates, non-inmates, and the institution 1604. The apps can include software modules that facilitate the monitoring of calls, messages, music, content, and/or the information that is accessed via and/or stored on the user devices 1606a-b. The apps can include software modules that monitor the devices to ensure that inmates are not able to use the devices and/or communications for prohibited purposes.

The server 1602 may provide or make available education courses, entertainment, and other content. Such content may include, but are not limited to, files having images, videos, text, audio, slides, presentations, other types of electronic content and/or combinations of types of electronic content. Courses may be accessed for viewing/use on the inmate devices 1606a-b. The content can include user interface features specific to particular courses or other content, functions for determining related content, and/or other functions useful in monitoring content provided via the inmate devices 1606a-b. The server 1602 and/or user devices 1606a-b may additionally or alternatively enforce configurable parameters, e.g., time limits, engagement tracking, etc.

The server 1602 and/or user devices 1606a-b provide user interfaces of one or more electronic briefcases. The server 1602 includes a user interface unit 1610 that generates electronic briefcase views with electronic briefcase content that is maintained by electronic briefcase unit 1612. The server 1602 also includes an authorization unit 1614 that determines whether to provide electronic briefcase user interfaces and/or content based on determining whether a requesting user and/or user device is authorized for such access.

Figure 17:
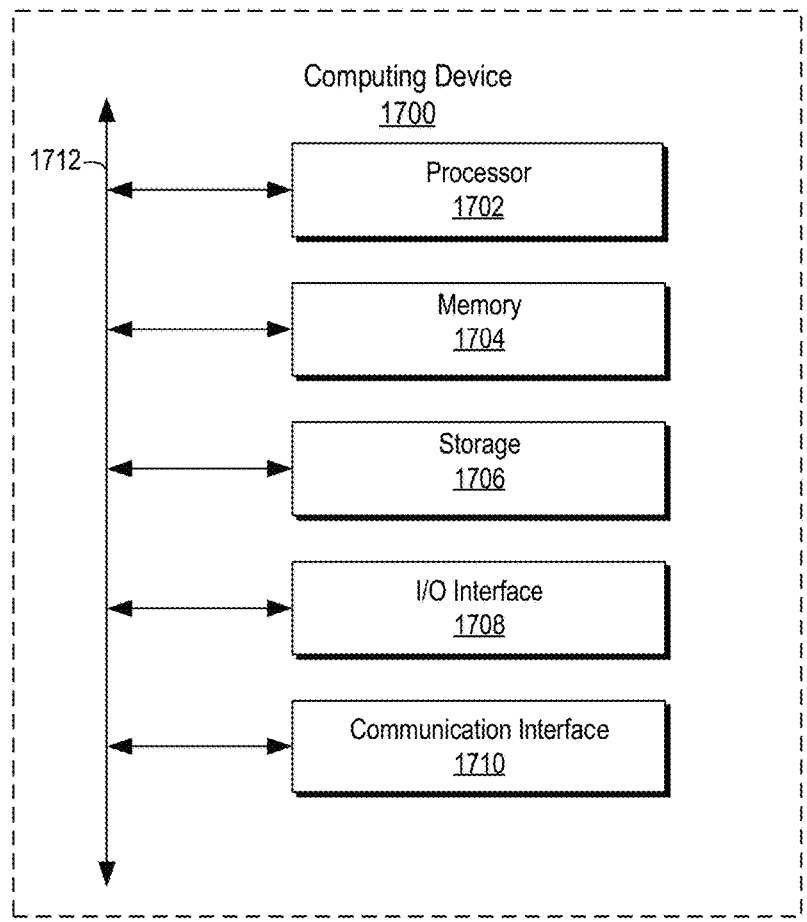
FIG. 17 is a block diagram depicting an example hardware implementation.

FIG. 17 is a block diagram depicting an example hardware implementation for the servers and devices described in FIG. 16. Each such device 1700 may include a processor 1702 that is communicatively coupled to memory 1704 and storage 1706 and that executes computer-executable program code and/or access information stored in the memory 1704 and storage 1706. The processor 1702 may comprise a microprocessor, an application-specific integrated circuit ("ASIC"), a state machine, or other processing device. The processor 1702 can include any of a number of processing devices, including just a single processing unit. Such a processor 1702 can include or may be in communication with a computer-readable medium storing instructions that, when executed by the processor, cause the processor to perform the operations described herein.

The memory 1704 and storage 1706 can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, and ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++ C#, Visual Basic, Java, Python, Perl, and JavaScript.

The device 1700 may also comprise a number of external or internal devices such as input or output devices. For example, the device 1700 may have input/output ("I/O") interface 1708 that can receive input from input devices or provide output to output devices. A bus 1712 can also be included in the device 1700. The bus 1712 can communicatively couple one or more components.

The device 1700 can also include at least one network interface device or other communication interface 1710. The communication interface 1700 can include any device or group of devices suitable for establishing a wired or wireless data or telephone connection to one or more networks. Non-limiting examples of a network interface device include an Ethernet network adapter, a modem, and/or the like. A device can transmit messages as electronic or optical signals.

An electronic device can be a computer, telephone, mobile device, tablet, smart phone, smart watch, or any communications device. A device can include a processor, memory, a bus, input/output components, network interface components, and other appropriate communication components. Non-limiting examples of input devices include a touch screen (e.g., one or more cameras for imaging a touch area or pressure sensors for detecting pressure change caused by a touch), a mouse, a keyboard, or any other device that can be used to generate input events in response to physical actions by a user of a computing device, or a microphone. Input devices may also include one or more cameras or other sensors that obtain information about the environment around the device. Non-limiting examples of output devices include an LCD screen, an external monitor, a speaker, or any other device that can be used to display or otherwise present outputs generated by a computing device.

The device can execute program code that configures the processor to perform one or more of the operations described above.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more Implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

The foregoing description and summary of the invention are to be understood as being in every respect illustrative and exemplary, but not restrictive, and the scope of the invention disclosed herein is not to be determined only from the detailed description of illustrative Implementations but according to the full breadth permitted by patent laws. It is to be understood that the Implementations shown and described herein are only illustrative of the principles of the present invention and that various modification may be implemented by those skilled in the art without departing from the scope and spirit of the invention.

What is claimed is:

1. A method comprising:
  at a processor:
    storing documents at a set of storage locations on an electronic storage device, the documents comprising documents generated via multiple sources, wherein the documents are associated with an electronic briefcase of an inmate, the multiple sources comprising:
- a scanning application;
- an educational course tracking application; and
- a video visitation recording application;

providing a user interface comprising an organization structure that comprises folders organizing representations corresponding to each of the documents associated with the electronic briefcase, the user interface accessible by the inmate;

receiving input changing the electronic briefcase within the user interface;

changing the electronic briefcase based on the input; and providing a second user interface comprising representations that are selectable to access one or more of the documents of the electronic briefcase of the inmate, wherein the second user interface is provided to the inmate after release from a confinement institution.

2. The method of claim 1, wherein the multiple sources further comprise a debit account application.

3. The method of claim 2, wherein the multiple sources further comprise a content creation application.

4. The method of claim 3, wherein the multiple sources further comprise a disciplinary tracking application.

5. The method of claim 3, wherein the multiple sources further comprise:
- a commissary account application;
- a jail managements system (JMS) application;
- an audio call recording application; and
- an inmate banking application.

6. The method of claim 1, wherein the scanning application is a postal mail scanning application.

7. The method of claim 6, wherein the folders of the organization structure comprise folders corresponding to the multiple sources.

8. The method of claim 1 further comprising:
providing a third user interface comprising representations that are selectable to access one or more of the documents of the electronic briefcase of the inmate, wherein the second user interface is provided to a person other than the inmate.

* * * * *